(12) United States Patent
Zandi

(10) Patent No.: US 12,416,760 B2
(45) Date of Patent: Sep. 16, 2025

(54) LOW-LOSS PHOTONIC WAVEGUIDES AND RING RESONATORS AND A METHOD FOR LOW-LOSS PHOTONIC WAVEGUIDE AND RING RESONATOR FABRICATION

(71) Applicant: OSCPS MOTION SENSING INC., Montreal (CA)

(72) Inventor: Kazem Zandi, Montreal (CA)

(73) Assignee: OSCPS MOTION SENSING INC., Montreal (CA)

( * ) Notice: Subject to any disclaimer, the term of this patent is extended or adjusted under 35 U.S.C. 154(b) by 392 days.

(21) Appl. No.: 18/076,069

(22) Filed: Dec. 6, 2022

(65) Prior Publication Data

US 2023/0176283 A1 Jun. 8, 2023

Related U.S. Application Data

(60) Provisional application No. 63/286,357, filed on Dec. 6, 2021.

(51) Int. Cl.
  *G02B 6/136* (2006.01)
  *G02B 6/132* (2006.01)
  *G02B 6/12* (2006.01)

(52) U.S. Cl.
  CPC .............. *G02B 6/136* (2013.01); *G02B 6/132* (2013.01); *G02B 2006/12061* (2013.01)

(58) Field of Classification Search
  None
  See application file for complete search history.

(56) References Cited

U.S. PATENT DOCUMENTS

| | | | |
|---|---|---|---|
| 6,865,314 B1 * | 3/2005 | Blair | G02B 6/12007 385/27 |
| 7,545,843 B2 | 6/2009 | Armani et al. | |
| 7,616,850 B1 * | 11/2009 | Watts | G02B 6/29335 385/32 |
| 7,820,970 B1 * | 10/2010 | Shaw | G01J 5/44 250/338.1 |
| 7,951,299 B2 | 5/2011 | Hossein-Zadeh et al. | |
| 8,818,146 B2 | 8/2014 | Vahala et al. | |

(Continued)

OTHER PUBLICATIONS

Jin, Piezoelectrically tuned silicon nitride ring resonator, Optics Express, vol. 26, No. 3, Feb. 5, 2018, pp. 3174-3187.

*Primary Examiner* — Jerry Rahll
(74) *Attorney, Agent, or Firm* — BCF LLP

(57) ABSTRACT

Low loss photonic waveguides and ring resonators are necessary for highly accurate gyroscope functionality. For fabrication of these low loss waveguides and ring resonators, an improved and cost-effective fabrication method has been proposed wherein for silicon nitride waveguides, a minimum of 2 μm thin bottom oxide cladding above etched trenches (cavities) in silicon facilitates both lower losses and higher Q values ring resonators as compared to the conventional 8 μm thick bottom oxide cladding without etched trenches in silicon. The trenches below the thin bottom oxide cladding are created through xenon difluoride (XeF2) gas etching in selective areas of silicon substrate through vias (openings). After etching the trenches, these vias are filled by the addition of a final top oxide cladding layer. The proposed method provides about three times improvement both in propagation losses as well as in quality factor for side coupled ring resonators.

18 Claims, 19 Drawing Sheets

(56) References Cited

U.S. PATENT DOCUMENTS

| | | | | |
|---|---|---|---|---|
| 2004/0179573 A1* | 9/2004 | Armani | ............... | H01S 3/0627 |
| | | | | 385/146 |
| 2006/0078254 A1* | 4/2006 | Djordjev | ............ | G02B 6/12007 |
| | | | | 385/32 |
| 2009/0097031 A1* | 4/2009 | Armani | .............. | G01N 33/0054 |
| | | | | 356/437 |
| 2010/0200733 A1* | 8/2010 | McLaren | .............. | G02F 1/3132 |
| | | | | 385/14 |
| 2018/0006424 A1* | 1/2018 | Vahala | .................... | G02F 1/395 |

* cited by examiner

Silicon nitride ring and bus waveguides with cavities

LOW-LOSS PHOTONIC WAVEGUIDES AND RING RESONATORS AND A METHOD FOR LOW-LOSS PHOTONIC WAVEGUIDE AND RING RESONATOR FABRICATION

CROSS-REFERENCE

The present application claims priority to U.S. Provisional Patent Application No. 63/286,357, entitled "Ring with Vertical Coupling," filed Dec. 6, 2021, the entirety of which is incorporated by reference herein.

TECHNICAL FIELD

The present technology generally relates to photonic waveguides and ring resonators and fabrication thereof.

BACKGROUND

As remote controlled and autonomous vehicles (such as drones) become more common, there is increasing interest in gyroscopes as sensors for measuring angular rotation. One type of gyroscope in the field of measuring angular velocity is optical gyroscopes, where the effect of rotation on light signals are monitored to detect rotational speed of an apparatus. In some such devices, a light phase shift due to Sagnac effect is used to measure angular velocity.

Ring resonators, coupled to waveguides, have been used in some solutions as functional parts of gyroscopes and inertial measurement systems, specifically chip-based gyroscopes aimed at providing small and cost-effective measurement of angular velocity.

Signal (light) loss from ring resonators, or coupling thereto, is a common source of reduced photonic gyroscope functionality and efficiency. Current state of the art requires exceedingly thick cladding layers to attain requisite loss figures.

There thus remains a desire for advancements in ring resonator-based systems.

SUMMARY

It is an object of the present technology to ameliorate at least some of the inconveniences present in the prior art.

According to an aspect of the present technology, there is provided an improved structure and method for cost-effective fabrication for low-loss photonic waveguides and ring resonators. Low loss ring resonators are necessary for photonic gyroscope functionality. The current state of the art requires exceedingly thick cladding layers to attain requisite loss figures. The thick cladding is necessary as any light that reaches the silicon handle wafer is attenuated, increasing the loss considerably. Growth of thick oxide layers is undesirable from a process point of view because such layers have high stress and can potentially bow the wafer, hindering lithography and subsequent processing steps. Additionally, growing thick oxide layer can take days, and as such the cost of processing rises considerably as oxide layers go above 2-3 µm. Thin oxide layers are more cost effective. The proposed method and structure for decreasing the attenuation loss due to silicon is to remove the silicon beneath the cladding, only in the region beneath the waveguide, using wet or dry etching techniques and in its place create an air or vacuum cavity lacking the same absorption characteristics as silicon. The effect of etched trenches in the silicon, also referred to herein as cavities, beneath the finite bottom silicon oxide ($SiO_2$) cladding of silicon nitride ($Si_3N_4$) optical waveguides with vertically and side coupled rings are shown to facilitate thinner bottom cladding while maintaining a desired loss profile. With the underlying air trenches, a 2 µm thick bottom cladding sufficiently confines light within the silicon nitride waveguide as compared to the conventional bottom silica oxide thickness of 8 µm (which is much more time consuming and expensive to prepare).

According to the present technology, silicon nitride waveguides can be created for vertical or side coupled rings. Such waveguides and resonator rings are fabricated via low pressure chemical vapor deposition (LPCVD) which are subsequently patterned using lithographic processes. The top cladding overlayer is silica deposited via plasma enhanced chemical vapor deposition (PECVD). The cavities, also referred to as trenches, below a bottom silica oxide cladding are created in this embodiment by xenon difluoride ($XeF_2$) gas, isotropically etching silicon in exposed areas through selectively formed openings or passages, also referred to herein as vias. After trench etching, these vias are capped by the addition of a final top oxide cladding layer, and then, if desired, the top surface can be smoothed by chemical mechanical polishing. Depending on the process, the openings could be filled or partially filled in an upper portion, but for CMP, the vias must be filled or the polishing slurry will fill the trench with debris. This capping layer improves device robustness and longevity by preventing potential contamination from depositing onto the underside surface of the cladding layer over time, contamination being a potential cause of increased light absorption. The capping overlayer also increases the strength of the oxide layer over the air trench by filling or partially filling in the vias; breakage of this suspended oxide layer could damage the waveguide and hinder its function.

According to one aspect of the present technology, there is provided an optical waveguide structure for an optical chip system, the structure including a substrate; at least one cladding layer deposited on the substrate; and at least one waveguide structure connected to the at least one cladding layer, the at least one waveguide structure including at least one of: a resonator ring, and a waveguide, a plurality of cavities being defined between the substrate and the at least one cladding layer, the plurality of cavities being formed by removal of material from the substrate, a plurality of openings being defined in the at least one cladding layer, each opening of the plurality of openings being located as to fluidly connect the plurality of cavities, the plurality of cavities having been formed by etching of the substrate via the plurality of openings.

In some embodiments, the plurality of cavities is positioned and arranged to reduce waveguide loss through the at least one cladding layer.

In some embodiments, the structure further includes at least one cladding overlayer deposited over the at least one of the resonator ring and the waveguide and the plurality of openings is sized and arranged to be closed by the at least one cladding overlayer, the at least one cladding overlayer covering the plurality of openings to impede entry of contamination into the plurality of openings and the plurality of cavities.

In some embodiments, a thickness of the at least one cladding layer is at least 2 micrometers; and a thickness of the at least one cladding overlayer is at least 2 micrometers.

In some embodiments, a distance between the waveguide and at least one of the plurality of openings is no less than 10 micrometers.

In some embodiments, the plurality of openings is spaced and arranged to form a plurality of bridges in the at least one cladding layer; and the plurality of bridges is configured to aid in maintaining structure of the at least one cladding layer in portions extending over the plurality of cavities in the substrate. The bridges serve to minimize stress related changes in geometry and membrane breakage after trench formation, that could impact in capping, CMP, dicing, wafer bonding, and handling steps.

In some embodiments, the at least one cladding layer includes: a first cladding layer deposited on the substrate, a second cladding layer deposited over the first cladding layer; the at least one waveguide structure includes: the ring resonator formed on the first cladding layer, and the waveguide formed on the second cladding layer; and the ring resonator and the waveguide are positioned and arranged for generally vertical coupling between them.

In some embodiments, the ring resonator is formed from silicon nitride; the first cladding layer disposed on the substrate is formed from oxide cladding; and the plurality of cavities is configured to decrease the effective refractive index, which provides an additional cladding effect between the oxide cladding and the substrate.

In some embodiments, the at least one waveguide structure includes: the ring resonator formed on the at least one cladding layer, and the waveguide formed on the at least one cladding layer; and the ring resonator and the waveguide are positioned in a same plane for side coupling arrangement, the plane being parallel to a surface of the substrate.

In some embodiments, the ring resonator is formed from silicon nitride; the at least one cladding layer disposed on the substrate is formed from oxide cladding; and the plurality of cavities is configured to decrease the effective refractive index, which provides an additional cladding effect between the oxide cladding and the substrate.

In some embodiments, the structure further includes at least one cladding overlayer deposited over the at least one of the resonator ring and the waveguide; and the at least one waveguide structure includes the ring resonator, and the waveguide; the waveguide has a width of about 2.8 micrometers, and a thickness of about 100 nanometers; the at least one cladding layer has a thickness of at least 2 micrometers; and the at least one cladding overlayer has a thickness of about a conventional 8 micrometers.

In some embodiments, the structure further includes at least one cladding overlayer deposited over the at least one of the resonator ring and the waveguide; and the at least one waveguide structure includes the ring resonator, and the waveguide; the waveguide has a width of about 2.8 micrometers, and a thickness of about 100 nanometers; the at least one cladding layer has a thickness of at least 2 micrometers, the at least one cladding layer being formed from oxide; and the at least one cladding overlayer has a thickness of about 2.5 micrometers, the at least one cladding overlayer being formed from silica.

In some embodiments, the structure further includes at least one cladding overlayer deposited over the at least one of the resonator ring and the waveguide; and the at least one waveguide structure includes the ring resonator, and the waveguide; the waveguide has a width of about 5.6 micrometers, and a thickness of about 40 nanometers; the at least one cladding layer has a thickness of at least 3 micrometers; and the at least one cladding overlayer has a thickness of about 15 micrometers, the at least one cladding overlayer being formed from silica.

In some embodiments, the structure is adapted and configured for use in a chip-based inertial measurement system.

According to another aspect of the present technology, there is provided a method for fabricating an optical waveguide structure, the method including depositing at least one cladding layer on a substrate; forming at least one waveguide structure on the at least one cladding layer, the at least one waveguide structure including at least one of a resonator ring, and a waveguide; depositing and patterning a layer of photoresist over at least the at least one cladding layer and the at least one waveguide structure; etching, via the photoresist, a plurality of openings through at least the at least one cladding layer; and etching, via the plurality of openings, portions of the substrate to form a plurality of cavities between the substrate and the at least one cladding layer.

In some embodiments, etching the plurality of cavities in the substrate includes etching a silicon substrate using XeF2.

In some embodiments, depositing the at least one cladding layer and forming the at least one waveguide structure includes depositing a first oxide cladding layer on the substrate; forming a resonator ring on the first oxide cladding layer; depositing a second oxide cladding layer over the resonator ring and the first oxide cladding layer; and forming a waveguide on the second oxide cladding layer.

In some embodiments, etching the plurality of openings includes etching through the second oxide cladding layer and the first oxide cladding layer; and further including depositing at least one cladding overlayer over the waveguide and the second oxide cladding layer, the at least one cladding overlayer covering the plurality of openings.

It should be understood that at least some of the elements described herein could be fabricated by deposition. In the present technology, additive deposition of layers is generally used to produce the components described herein. It is contemplated that other approaches could be used.

The term "deposit" in reference to fabrications methods, as used herein, refers broadly to methods and processes of mechanically and/or chemically applying a material to one or more desired locations, or as a layer, on a surface. The methods and processes encompassed by the term "deposit" herein include but are not limited to: spin-coating, photoresist development and etching, photolithography, electron-beam lithography, thermal oxidation, plasma etching, low pressure chemical vapor deposition, plasma enhanced chemical vapor deposition, and physical vapor deposition, wafer to wafer bonding.

Quantities or values recited herein are meant to refer to the actual given value. The term "about" is used herein to refer to the approximation to such given value that would reasonably be inferred based on the ordinary skill in the art, including equivalents and approximations due to the experimental and/or measurement conditions for such given value.

Embodiments of the present disclosure each have at least one of the above-mentioned objects and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of embodiments of the present disclosure will become apparent from the following description and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
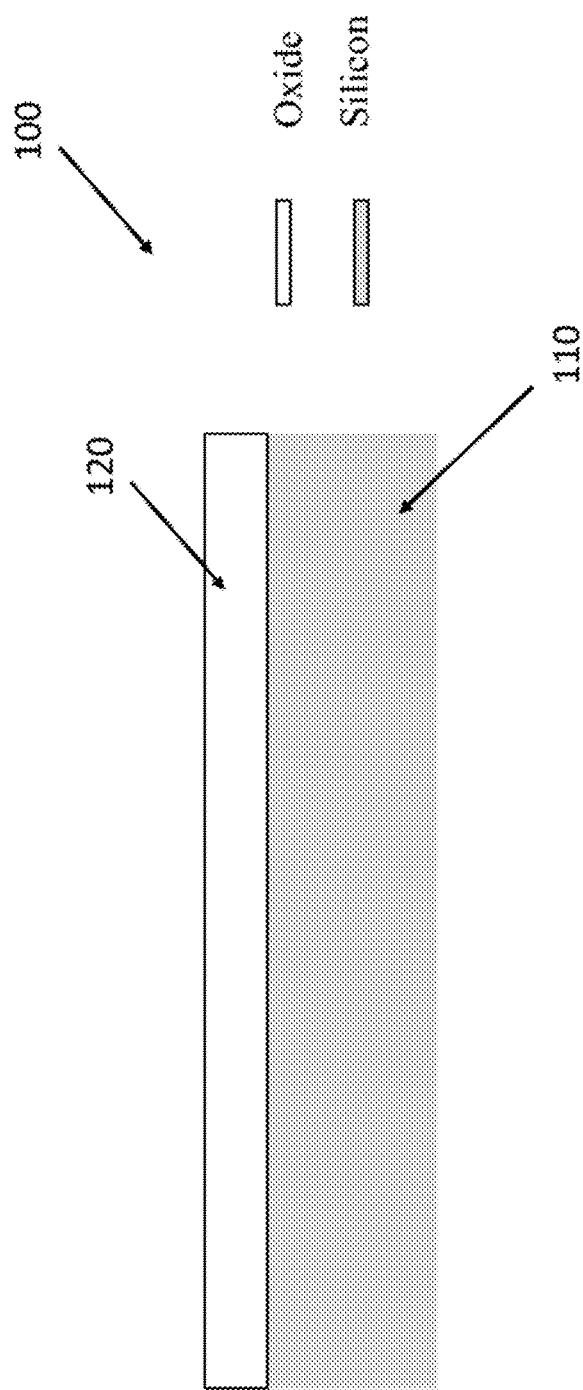
FIG. 1 is a schematic cross-sectional view of a chip structure illustrating a first processing step of a fabrication method according to non-limiting embodiments of the present technology, the fabrication method being configured to form a vertically coupled ring resonator and waveguide, with a layer of oxide being deposited on a silicon substrate.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims. It should be noted that the Figures may not be drawn to scale, except where otherwise noted.

DETAILED DESCRIPTION

With reference to FIGS. 1 to 6, an optical waveguide structure 100 for an optical chip system according to one non-limiting embodiment of the present technology is illustrated, specifically through different fabrication steps thereof. The present technology provides a ring resonator and waveguide arrangement, specifically in a vertical coupling arrangement (see FIGS. 2-6), generally for use in a chip-based inertial measurement system, for example a chip-based gyroscope. At least some aspects of the present technology could be applied to different chip-based optical assemblies, including some for waveguides or ring resonators for different applications.

With reference to FIG. 1, the structure 100 is shown at a first fabrication step. A cladding layer 120 is deposited on a silicon substrate 110. In the present embodiment, the cladding layer 120 is a 2 μm oxide layer. Depending upon thickness used and method of deposition, this could be single- or double-sided oxide, where the substrate 110 could have a layer of oxide deposited on parallel surfaces.

Figure 2:
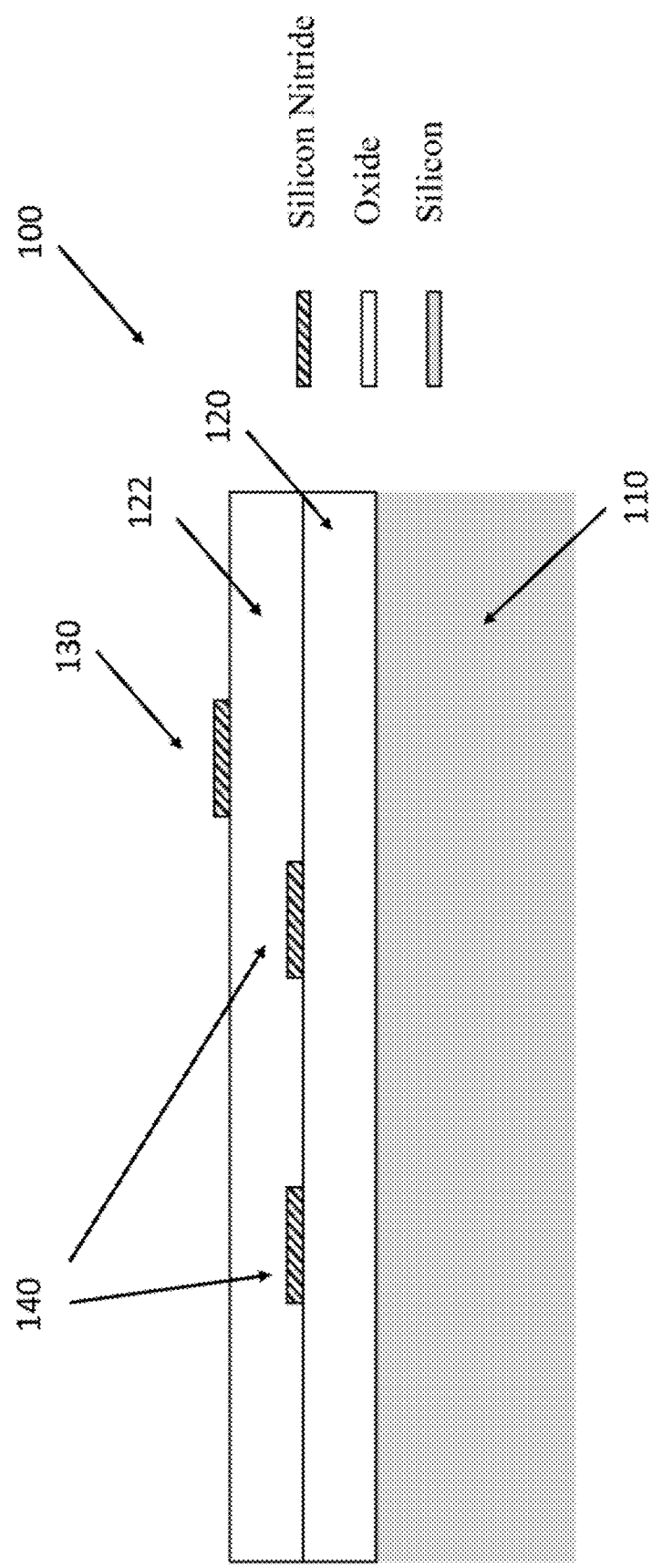
FIG. 2 is the schematic cross-sectional view of the chip structure of FIG. 1, illustrating a second step of the fabrication method, with the ring resonator, a cladding, and a vertical coupler waveguide having been formed on the oxide layer.

With reference to FIG. 2, a resonator ring 140 is deposited on the layer 120 (two portions of the ring 140 being illustrated in cross-section). Specifically, silicon nitride is deposited on the oxide layer 120 and then etched to form the ring 140. Another cladding layer 122 is then deposited over the ring 140 and the oxide layer 120, specifically a 2 μm middle oxide cladding layer 122. Another layer of silicon nitride is then deposited and etched to form the bus waveguide 130, also referred to herein simply as the waveguide 130. It is contemplated that other materials than silica nitride could be used to form the ring 140 and/or the waveguide 130, depending on the particular embodiment. It is contemplated that different thickness of the layer 122 could modify optical coupling between vertical waveguides for different applications.

Figure 3:
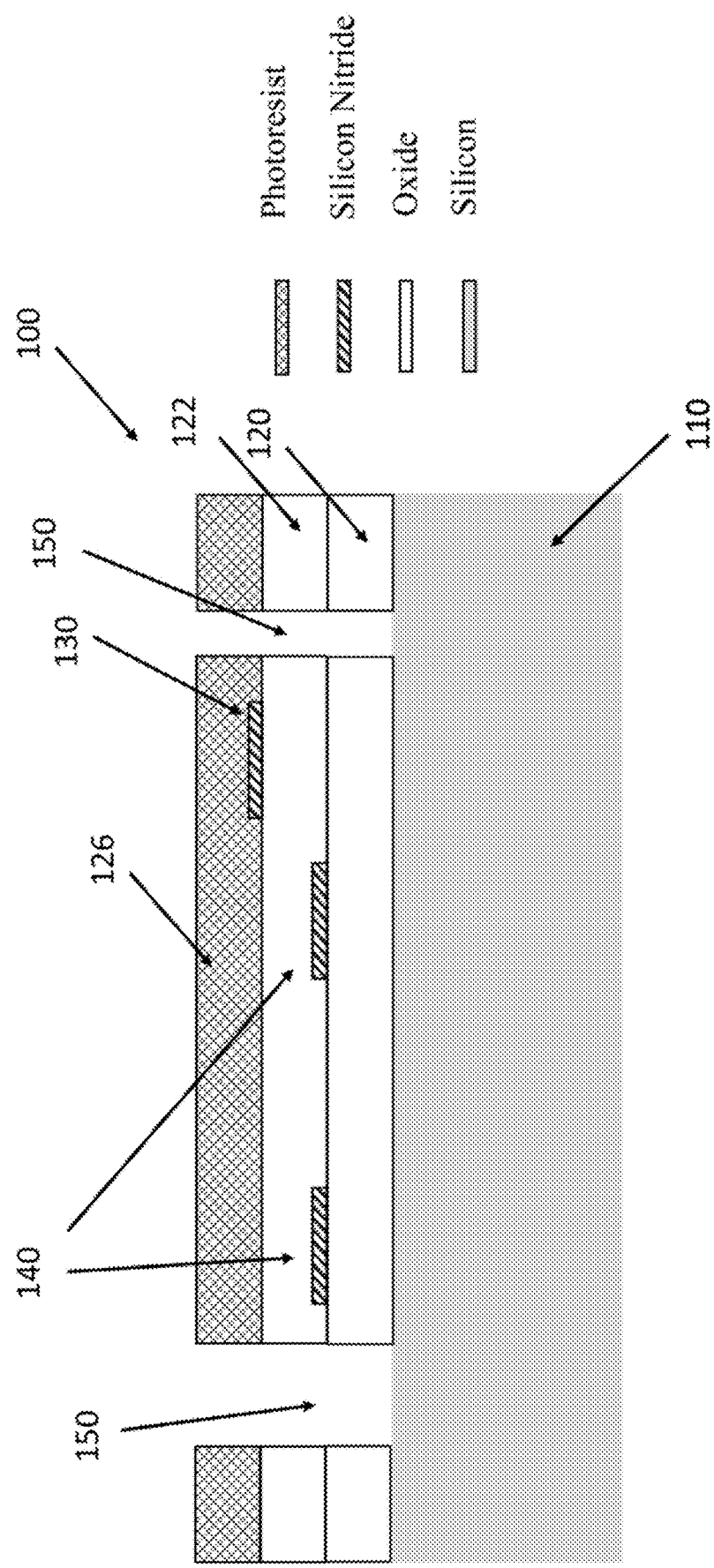
FIG. 3 is the schematic cross-sectional view of the chip structure of FIG. 1, illustrating a third step of the fabrication method, with a photoresist having been deposited, patterned, and etched to form openings to reach the silicon substrate.

The next step in fabrication of the structure 100 is illustrated in FIG. 3. A layer of photoresist 126 is deposited, patterned and then etched to form a plurality of openings 150, also referred to herein as vias 150. The vias 150 are etched down to the silicon substrate 110. As would be generally known to a person of skill in the art, a layer of oxide or other protective layer would generally be deposited over the waveguide 130 and/or other top optical layers before application of the photoresist; the particular material or manner is not meant to be limited in the present technology.

Figure 4:
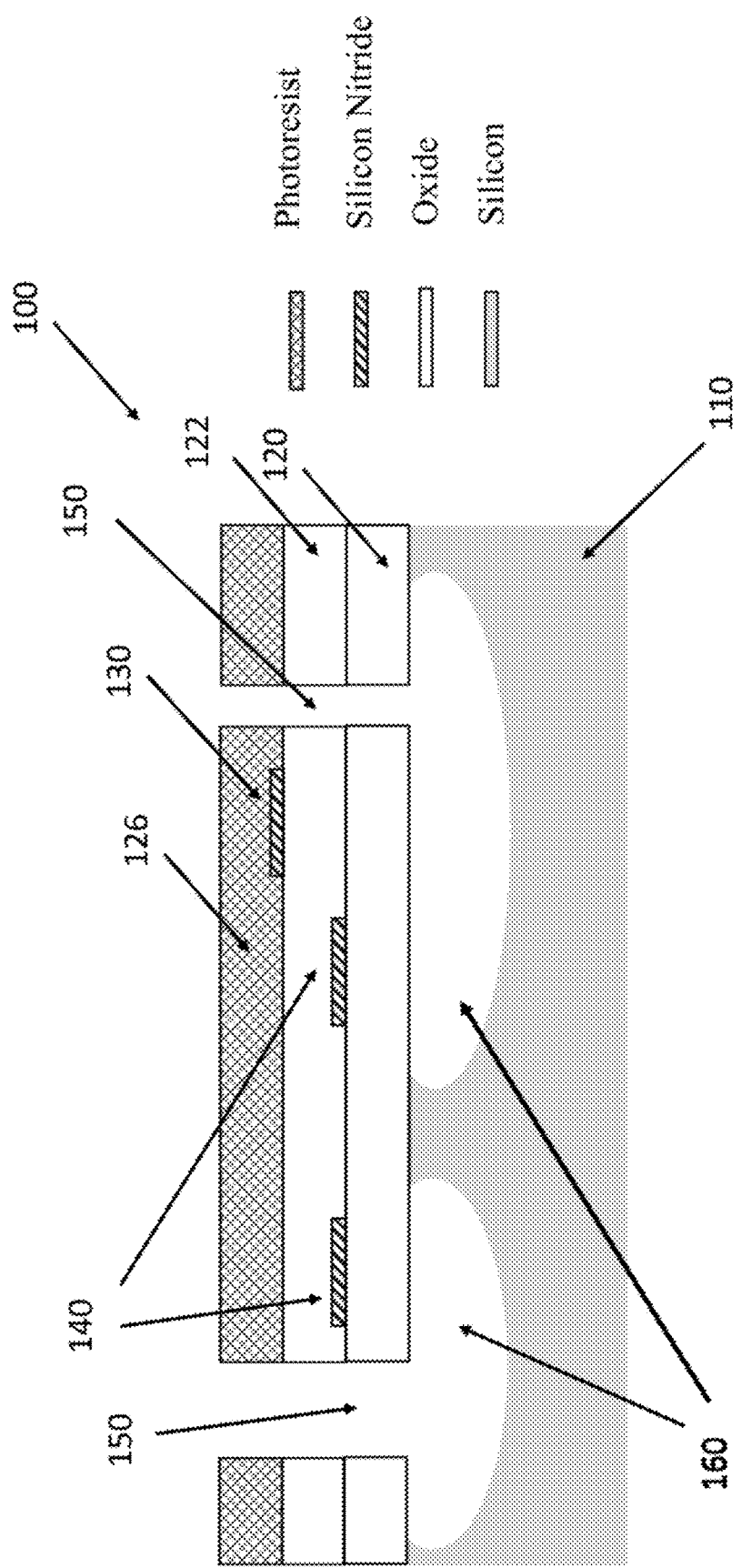
FIG. 4 is the schematic cross-sectional view of the chip structure of FIG. 1, illustrating a fourth step of the fabrication method, with the silicon substrate being etched to create a plurality of cavities.

The next step in fabrication of the structure 100 is illustrated in FIG. 4. Following etching of the vias 150, the silicon substrate 110 is etched to form a plurality of cavities 160 in the substrate 110. The cavities 160 are arranged between the cladding layer 120 and the substrate 110 in order to lower the effective index of refraction under the ring 140. While shown as simply an air trench in the present embodiment, it is contemplated that the cavities 160 could be sealed in vacuum or filled with an inert gas, such as argon or nitrogen. The openings 150 are arranged to permit adequate access to the substrate 110, while maintaining sufficient structure in the oxide layer 120 for strength and reliability of the structure 100. The strength and reliability of the structure 100 has an impact on, among different factors, the overall successful yield of production of the structures 100. Improved yield in turn improves production costs in many cases.

Figure 5:
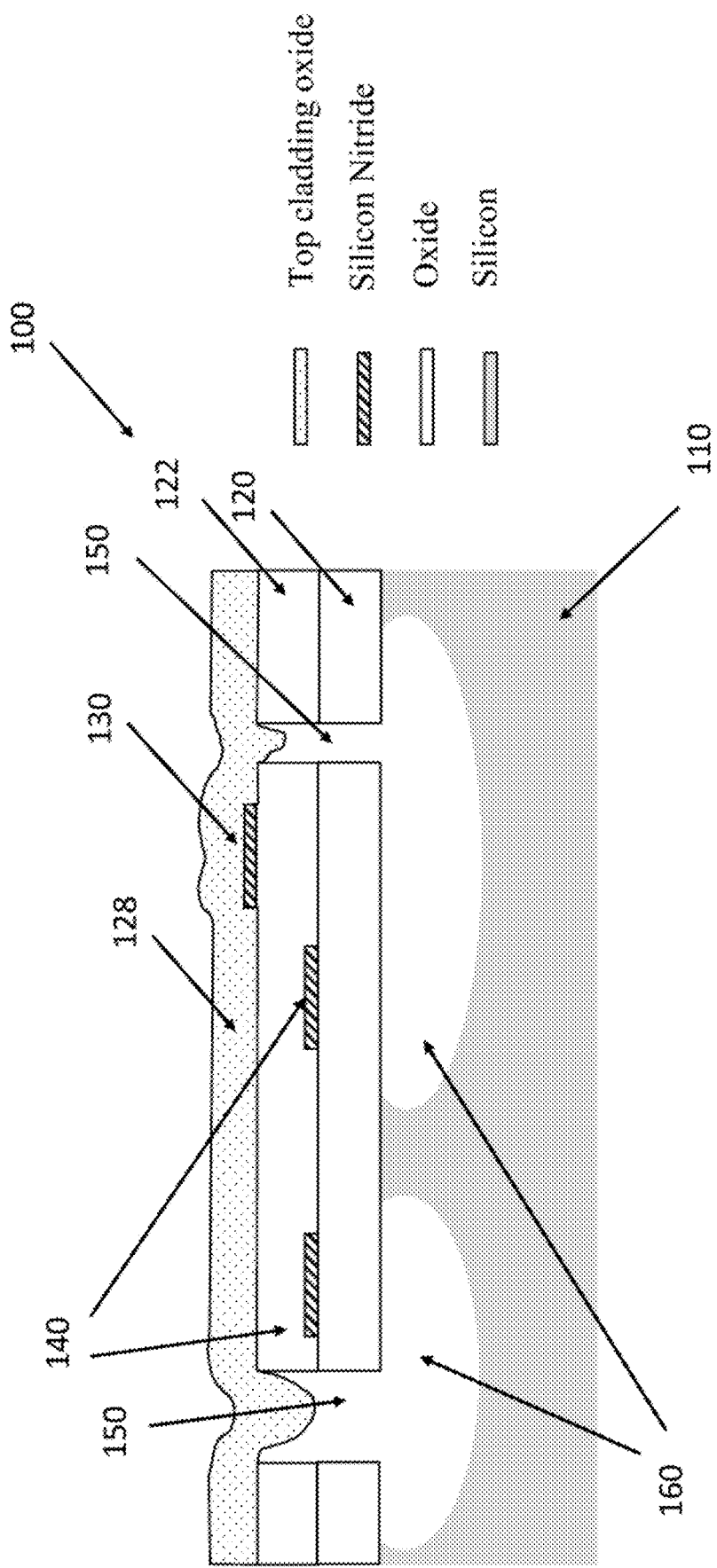
FIG. 5 is the schematic cross-sectional view of the chip structure of FIG. 1, illustrating a fifth step of the fabrication method, with the resist being removed and a top cladding oxide being deposited.

With reference to FIG. 5, following etching of the cavities 160, the photoresist 126 is removed. A cladding overlayer 128 is then deposited over the waveguide 130 and the cladding layer 122. In the present embodiment, the cladding overlayer 128 is specifically a 6 µm top cladding oxide layer. In at least some embodiments, the overlayer 128 could be formed from a different material, including but not limited to silica.

Figure 6:
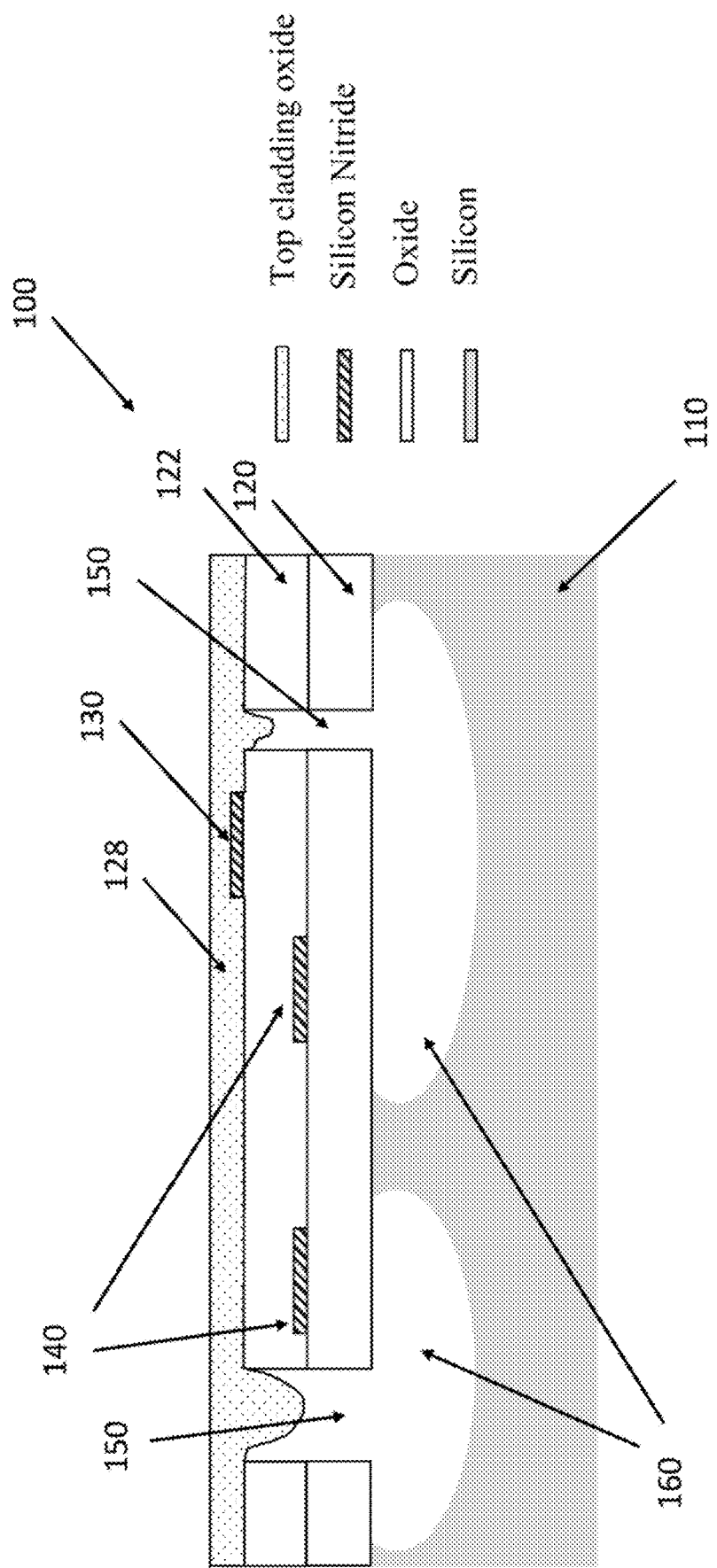
FIG. 6 is the schematic cross-sectional view of the chip structure of FIG. 1, illustrating a sixth step of the fabrication method, with a surface of the structure having been smoothed by chemical mechanical polishing (CMP)

When necessary or desired to complete the structure 100, a chemical mechanical polishing process (CMP) is performed to smooth out a top surface. The completed structure 100 with smoothed surface is illustrated in FIG. 6. In at least some cases, the smoothing aids in reducing loss and is crucial in embodiments that involve wafer to wafer bonding of oxide, where silica or glass layers increase dielectric capping layer thickness.

By providing such a structure with thin oxide cladding layers 120, 122, made possible by the reduced loss produced by the cavities 160, there is an overall reduced cost of fabrication, due at least in part to the greatly reduced production time to create 2 µm oxide layers.

Figure 7:
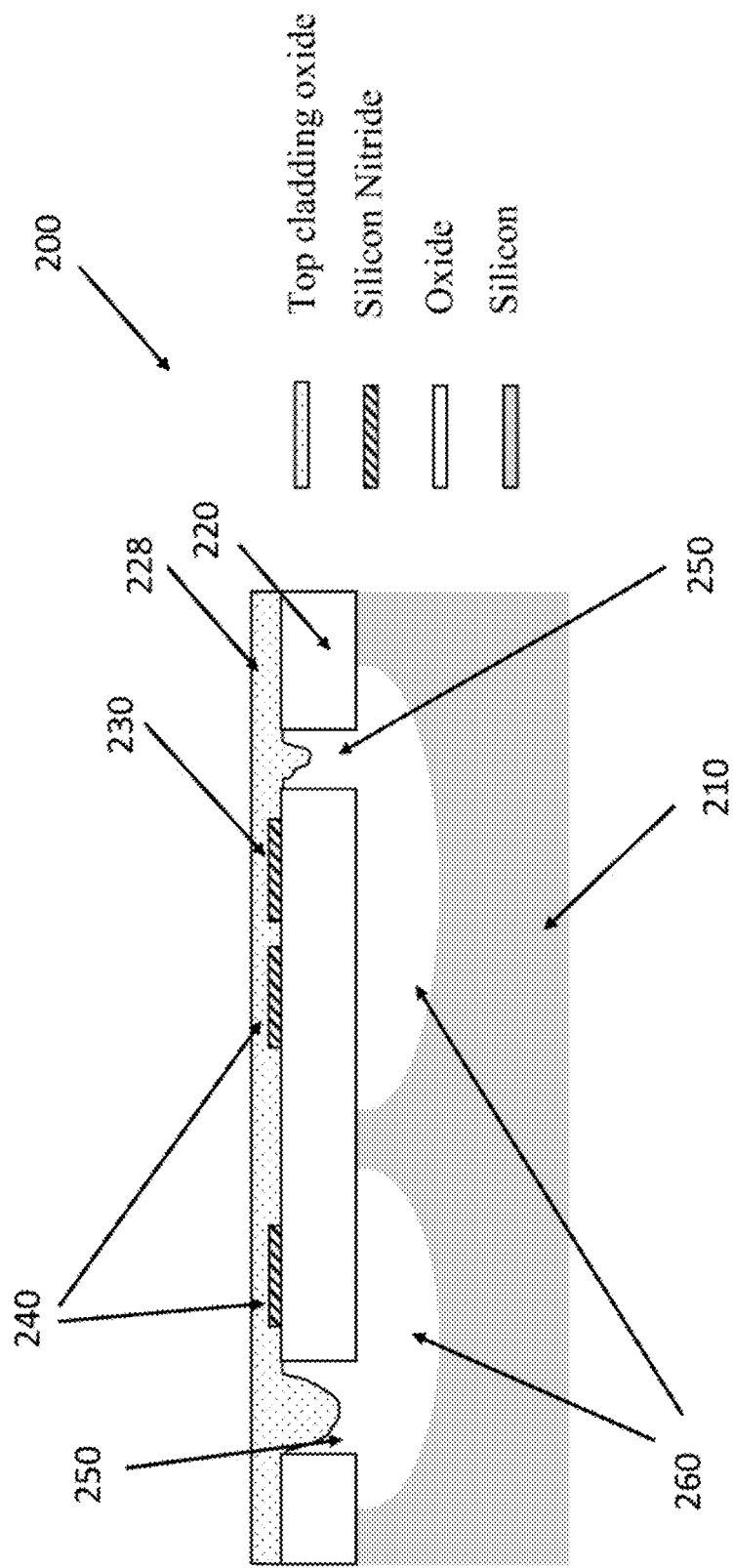
FIG. 7 is a schematic cross-sectional view of another embodiment of a ring resonator and waveguide structure, with the ring resonator and waveguide being arranged for side coupling.

With reference to FIG. 7, another non-limiting embodiment of an optical waveguide structure 200 according to the present technology is illustrated. The structure 200 is arranged for side coupling, with a ring resonator 240 and a bus waveguide 230 deposited in a same plane parallel to a substrate 210. Generally, vertical resonator ring and waveguide coupling arrangements provide higher Q factors compared to arrangements using side coupling. This is due to coupling through the nitride surface deposited (smooth surface leading to low scattering loss) instead of side walls that generally have greater roughness. It is noted that, however, there may be other factors in fabrication or final product application for which a side coupling arrangement may be preferable.

A bottom oxide cladding layer 220 is deposited on the silicon substrate 210, specifically of 2 µm thin oxide. To form the ring 240 and the waveguide 230, silicon nitride is then deposited, patterned, and etched. A layer of photoresist (not shown) is then deposited over the cladding layer 220, the ring 240, and waveguide 230. The photoresist is then patterned and then etched (through the layer 220) to form a plurality of openings 250 to reach the silicon substrate 210. The silicon substrate 210 is then etched with XeF2 to create cavities 260 as additional effective cladding for the ring 240. As a last step, the photoresist is removed and then a 6 µm top oxide cladding layer 228 is deposited. The resulting surface is smoothed by chemical mechanical polishing (CMP).

In at least some embodiments, for either structure 100, 200, the minimum thickness of the thin bottom oxide cladding 120, 220 is close to 2 µm, where the waveguide has a width of about 2.8 µm and thickness 100 nm with top silica oxide thickness of about 8 µm. In at least some embodiments, for either structure 100, 200, the minimum thickness of the thin bottom oxide cladding is close to 2 µm for the waveguide width of 2.8 µm and thickness 100 nm with top silica clad thickness of 2.5 µm. In at least some embodiments, for either structure 100, 200, the minimum thickness of the substrate 110, 210 is close to 3 µm for the waveguide width of 5.6 µm and thickness of 40 nm with top silica cladding layer 128, 228 thickness of 15 µm.

The structure 200, with the ring 240 with side coupling using the silicon nitride waveguides of 2.8 µm width and 100 nm thickness fabricated with trenches (cavities) underneath the thin bottom oxide have been tested and determined to result in about three times of improvement both in propagation losses as well as in Quality factors, compared to similar structures fabricated without trenches (cavities).

In at least some non-limiting embodiments of the present technology, the method of fabricating the structure 100 and/or the structure 200 can be described as follows.

Ring with Vertical Coupler

1—Finite thickness of 2 µm bottom oxide cladding (for the case of silicon nitride width of 2.8 um) is deposited on both sides of a clean and bow free silicon wafer through thermal oxidation.

2—First layer of LPCVD stoichiometric silicon nitride of thickness 100 nm is deposited and patterned to form the ring with width of 2.8 µm.

3—Nitride was annealed with combination of hydrogen and oxygen for 1 hour at 1098 degree Celsius 4—Middle oxide with 2 um thickness is deposited with PECVD.

5—Second layer of LPCVD stoichiometric nitride of thickness of 100 nm is deposited and patterned to form the bus waveguide(s) with width of 2.8 µm.

6—Photoresist is deposited and then patterned followed by etching of 4 µm-thick oxide to form the vias and expose the silicon substrate.

7—Silicon is etched with XeF2 to create air trench as second cladding for the ring.

8—The photoresist is removed and then 3 µm top oxide cladding is deposited with PECVD. The top oxide cladding also serves to fill up the via. For larger top oxide cladding thickness of 6 um, the two step PECVD was performed.

9—Final inspection of the vias fill and quality of the top oxide cladding is done.

10—If necessary or desired, CMP is performed and final evaluation of wafer bow was done.

Ring with Side Coupler

Steps 1 and 3 remain the same as in (1), except that Step 2 is now used to simultaneously form the ring resonator and waveguide(s)

3—The photoresist is then patterned followed by etching of 2 µm thin oxide to form the vias to reach the silicon substrate.

4—The silicon is etched with XeF2 to create air trench as the second cladding for the ring.

5—As a last step, the photo resist is removed and then 6 µm top oxide cladding is deposited and the resulting surface is smoothed by chemical mechanical polishing.

Modeling and Examples

Figure 8A:
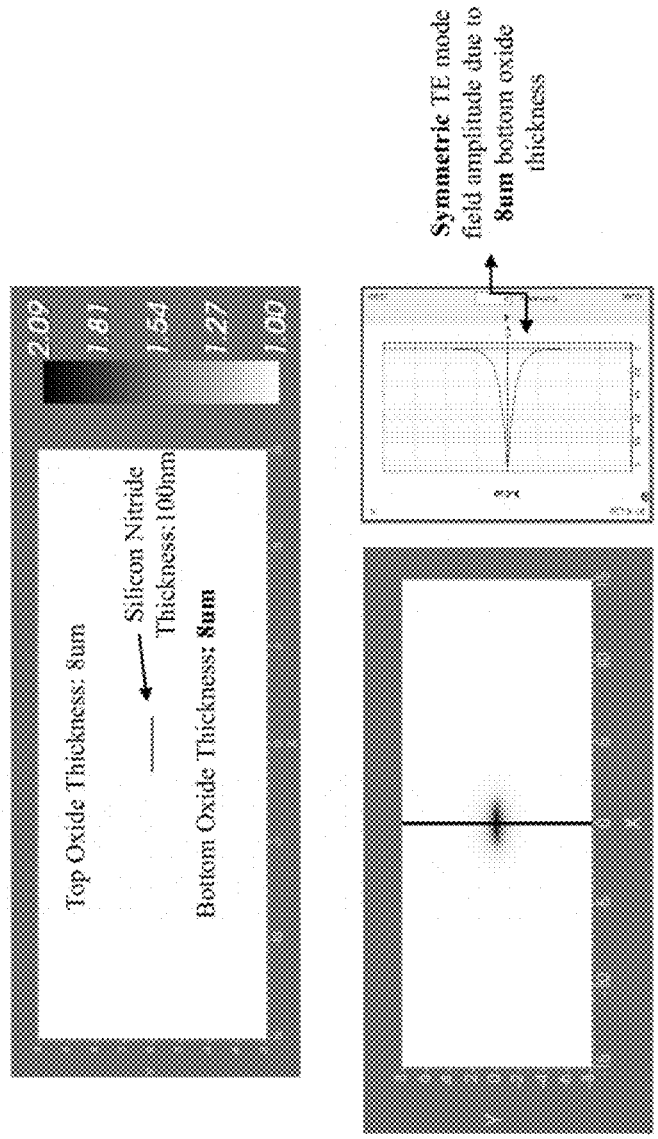
FIGS. 8A, 8B, 8C illustrate simulations of TE modal field amplitude along waveguide thickness for different bottom oxide thicknesses.
Figure 8B:
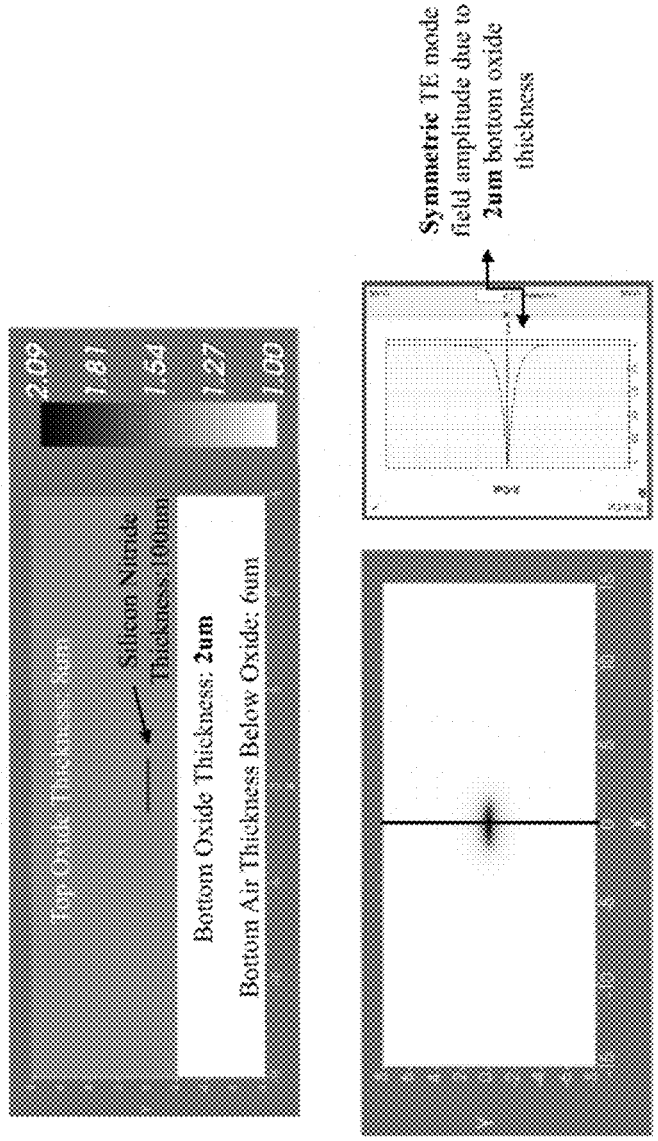
Figure 8C:
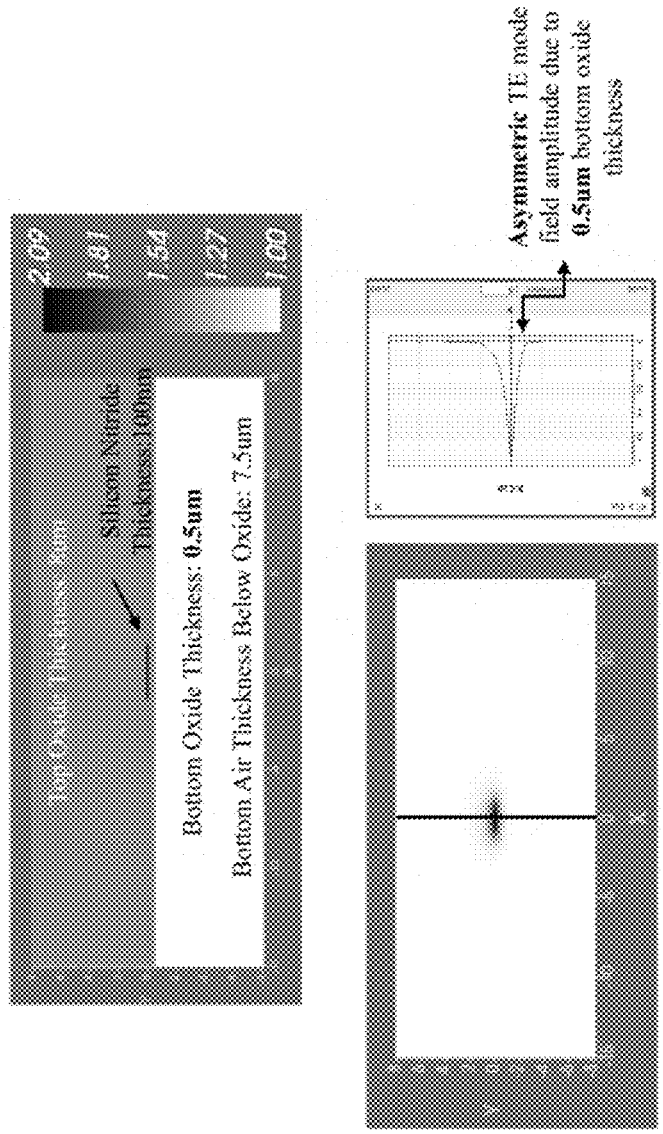

FIGS. 8A, 8B, 8C illustrate the effect of bottom oxide thickness on the TE modal field amplitude along waveguide thickness. When top oxide cladding is 8 um and silicon nitride thickness is 100 nm the 2 µm bottom oxide cladding with cavities underneath does not generally change the TE modal field amplitude and it remains the same as the 8 µm bottom oxide cladding. When the bottom oxide cladding is further reduced from 2 µm to about 0.5 µm then the TE modal field along the thickness direction gets squeezed in upward direction and becomes asymmetric as shown in FIG. 8C. As a conclusion, 2 µm or more bottom oxide cladding is sufficient enough to confine the light within silicon nitride waveguide without making it to behave asymmetrically.

Figure 9:
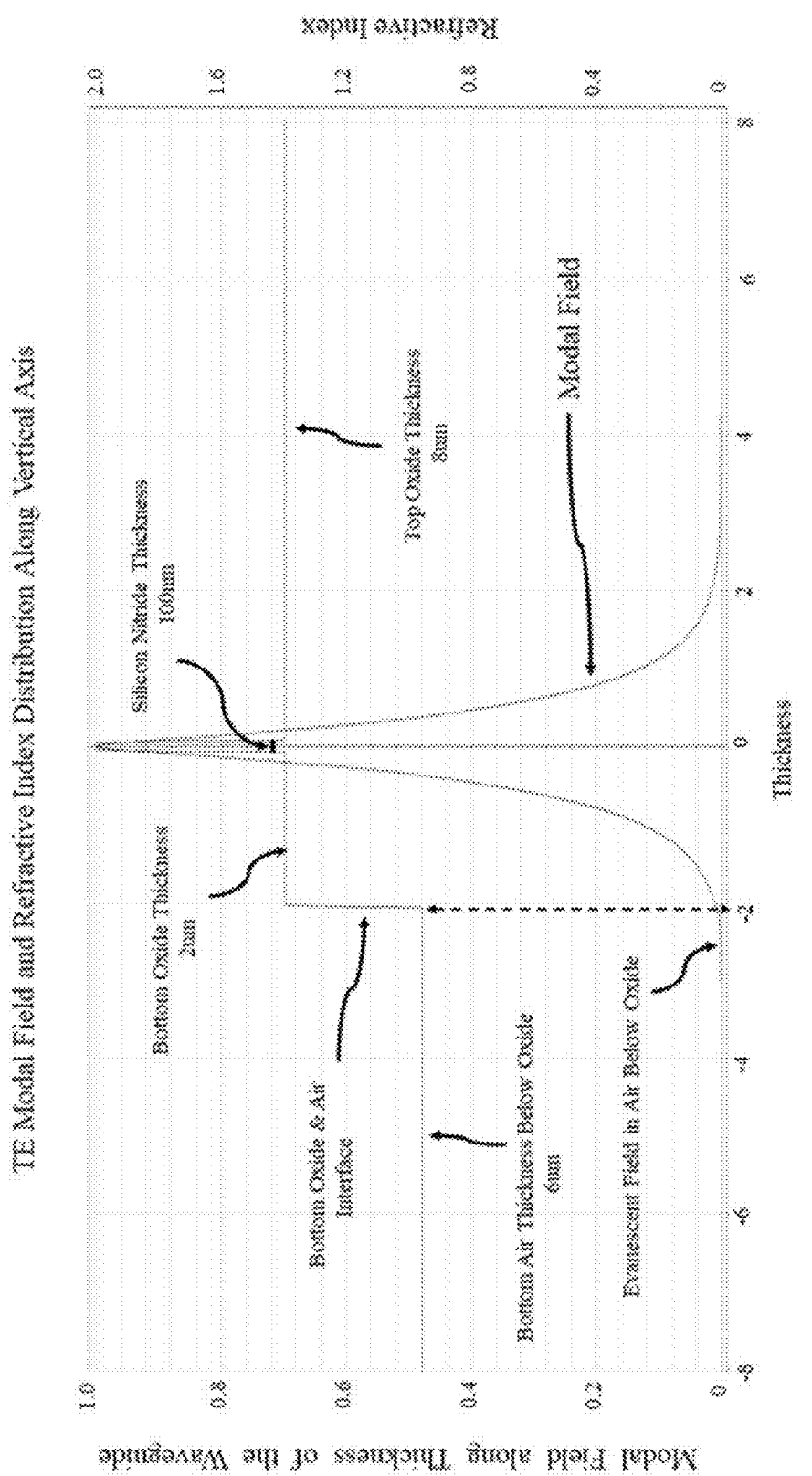
FIG. 9 is an enlarged view of a portion of FIG. 8B illustrating a simulated plot of TE modal field distribution along thickness of the waveguide for silicon nitride with of 2.8 μm and thickness of 100 nm for top oxide thickness of 8 um and bottom oxide thickness of 2 μm with cavities there below.

FIG. 9 is an enlarged view of a portion of FIG. 8B illustrating a simulated plot of TE modal field distribution along thickness of the waveguide for silicon nitride width of 2.8 µm and thickness of 100 nm for top oxide thickness of 8 µm and bottom oxide thickness of 2 µm with air trench below it, showing that evanescent modal field approaches zero.

Figure 10:
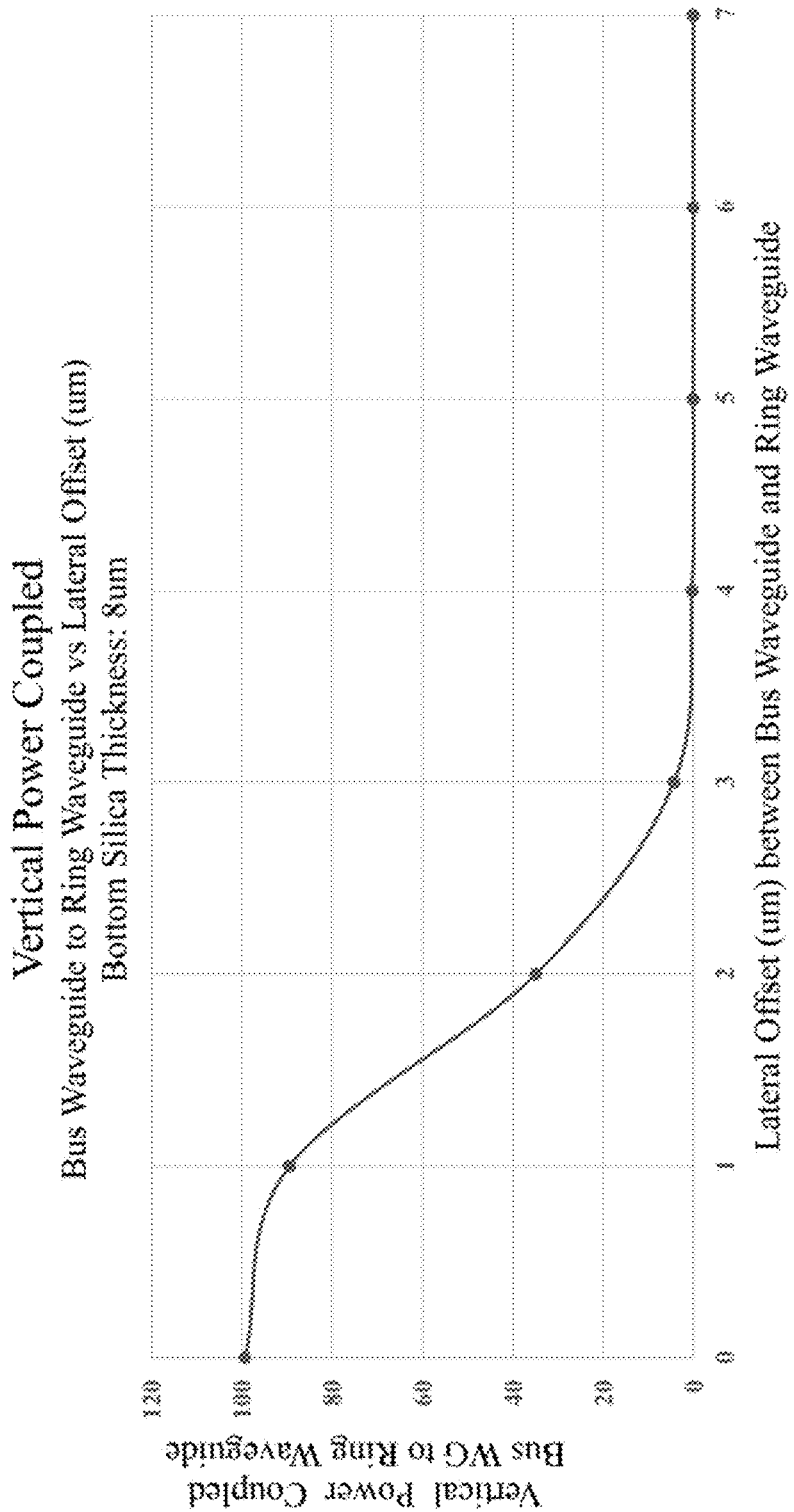
FIG. 10 is a simulated plot of bus waveguide to ring waveguide coupling versus lateral offset between the bus waveguide and the ring waveguide for fixed bottom cladding thickness of 8 μm for the ring resonator of FIG. 6 with vertical coupling.

FIG. 10 is a simulated plot of bus waveguide 130 to the ring 140 versus lateral offset between the waveguide 130 and the ring 140 for fixed bottom cladding thickness of 8 µm for ring with vertical coupling. This lateral offset allows the illustrated magnitude of power coupling between the bus waveguide 130 to the ring waveguide (resonator) 140.

Figure 11:
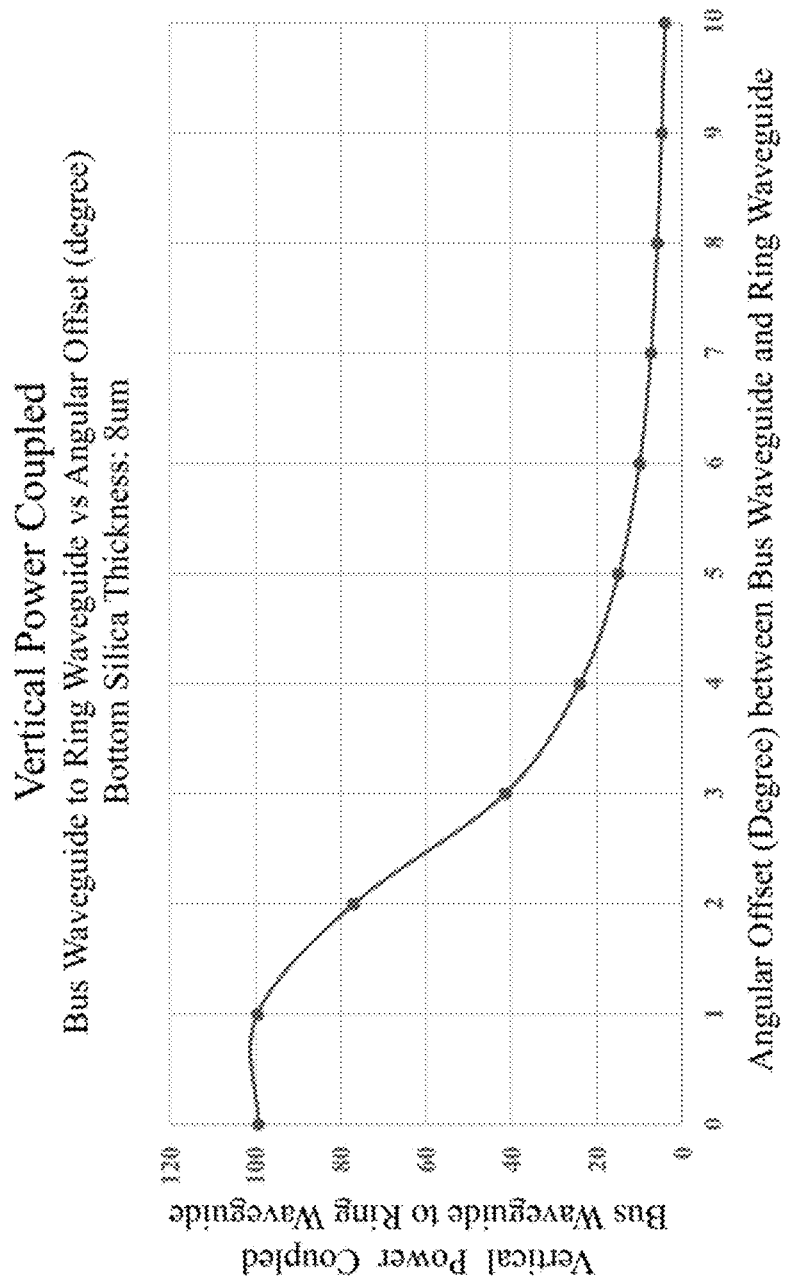
FIG. 11 is a simulated plot of bus waveguide to ring waveguide coupling versus angular offset between the bus waveguide and the ring waveguide for fixed bottom cladding thickness of 8 μm for the ring resonator of FIG. 6 with vertical coupling.

FIG. 11 is a simulated plot of the bus waveguide 130 to the ring 140 versus angular offset between the waveguide 130 and the ring 140 for fixed bottom cladding thickness of 8 µm for ring with vertical coupling. This angular offset allows the illustrated magnitude of power coupling between the bus waveguide 130 to the ring waveguide (resonator) 140 when the lateral offset is zero.

Figure 12:
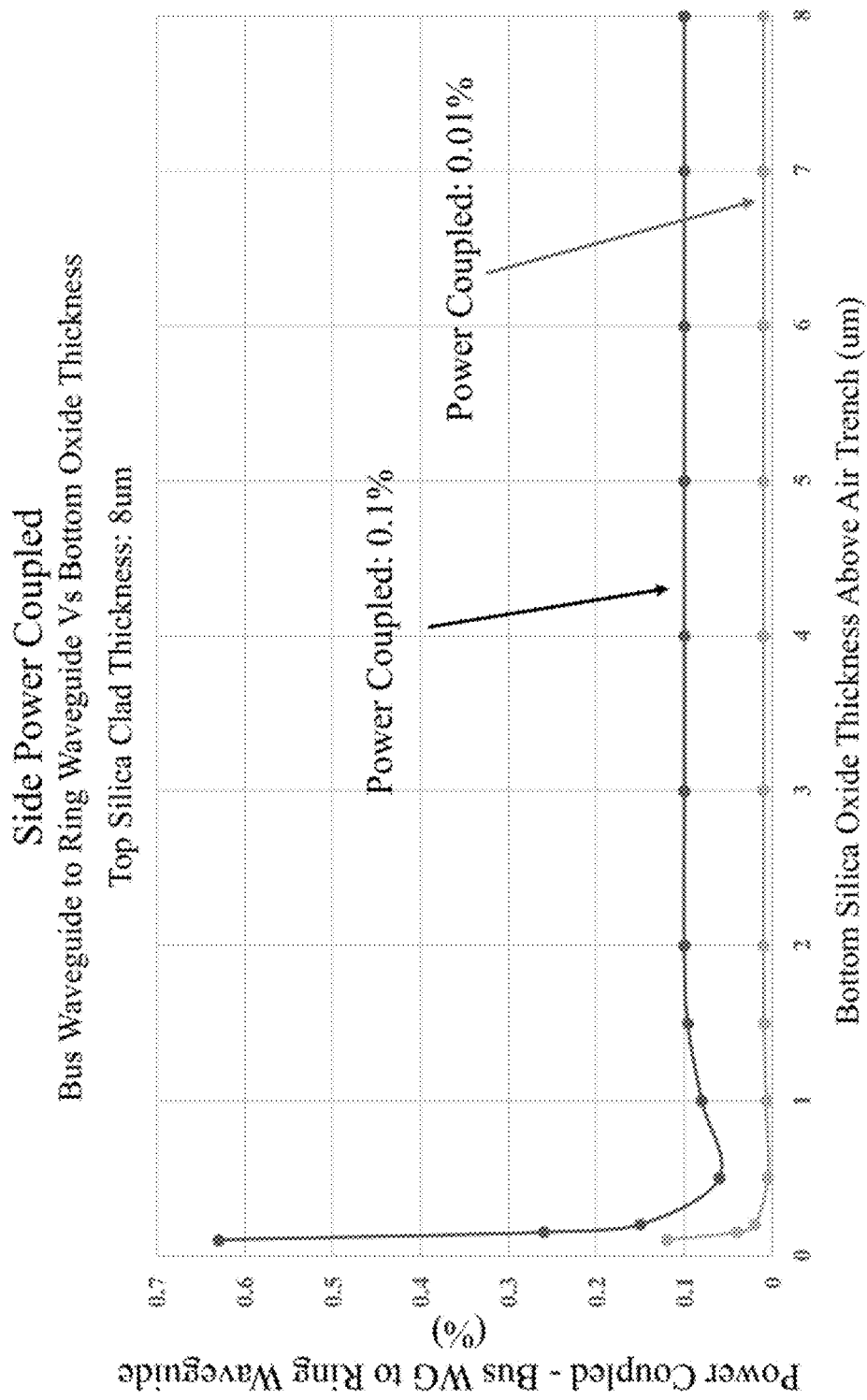
FIG. 12 is a simulated plot of bus waveguide to ring waveguide coupling versus bottom silica thickness for top silica clad thickness of 8 μm for the ring resonator of FIG. 7 with side coupling.

FIG. 12 is a simulated plot of bus waveguide 230 to the ring 240 versus bottom silica thickness for top silica clad thickness of 8 um for ring with side coupling. The black curve shows 0.1% power coupling from bus waveguide to ring waveguide when bottom cladding thickness is 8 um to 2 um. Below 2 µm of bottom cladding thickness the coupled power from bus waveguide to ring waveguide suddenly increases, showing 2 µm of bottom cladding thickness above air cladding is sufficient. The same behaviour is expected for 0.01% of power coupling from bus waveguide to ring waveguide as shown by grey curve.

Figure 13:
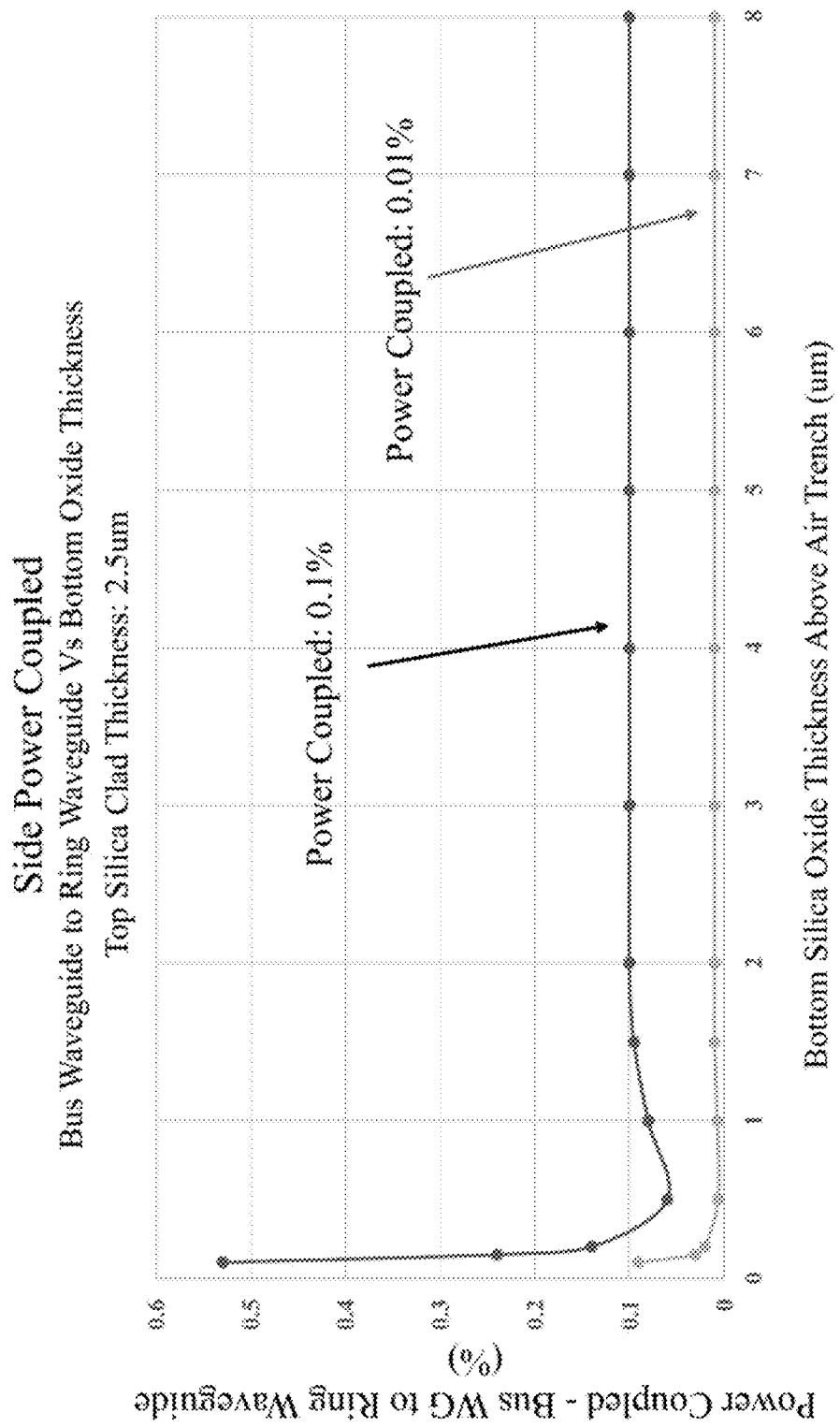
FIG. 13 is a simulated plot of bus waveguide to ring waveguide versus bottom silica thickness for top silica clad thickness of 2.5 μm for the ring resonator of FIG. 7 with side coupling.

FIG. 13 is a simulated plot of bus waveguide 230 to the ring 240 versus bottom silica thickness for top silica clad thickness of 2.5 µm for ring with side coupling. The black curve shows 0.1% power coupling from bus waveguide to ring waveguide when bottom cladding thickness is 8 µm to 2 µm. Below 2 µm of bottom cladding thickness the coupled power from bus waveguide to ring waveguide suddenly increases, showing 2 µm of bottom cladding thickness above air cladding is sufficient. The same behaviour is expected for 0.01% of power coupling from bus waveguide to ring waveguide as shown by grey curve.

Figure 14A:
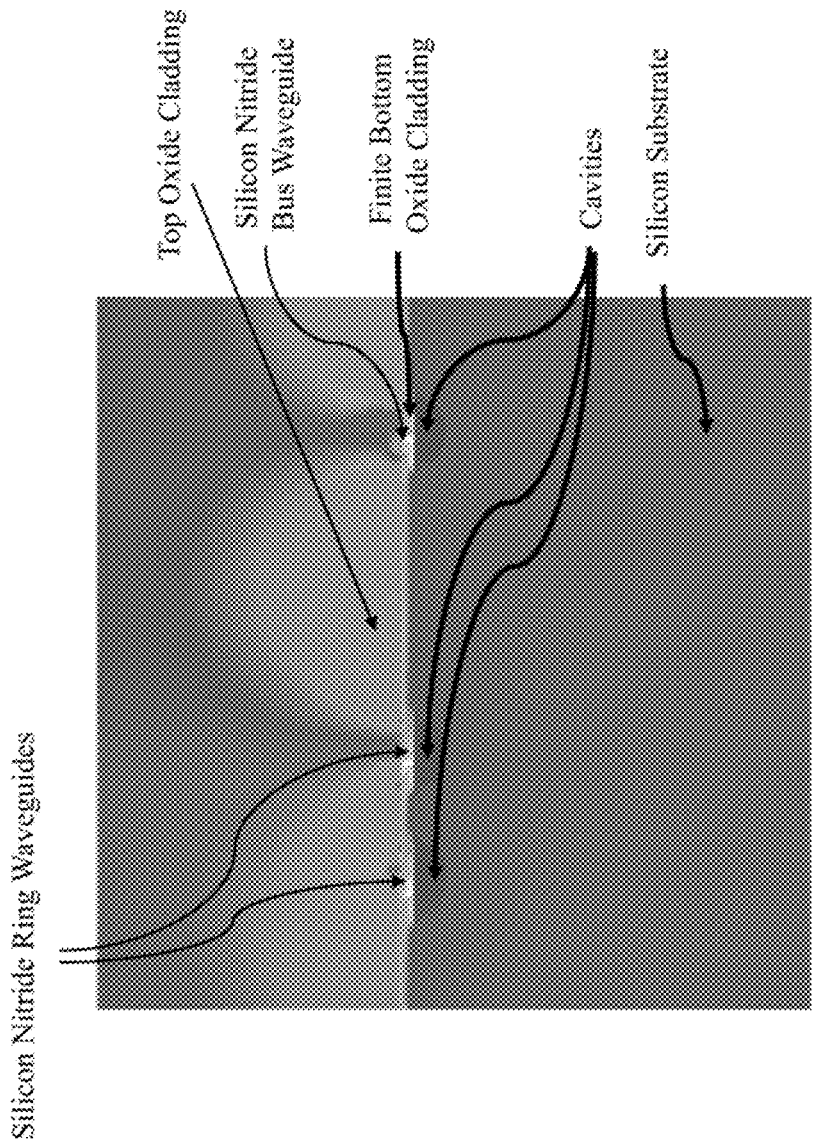
FIG. 14A is a SEM cross-section of an example construction of the structure of FIG. 7 with the side coupled ring resonator.
Figure 14B:
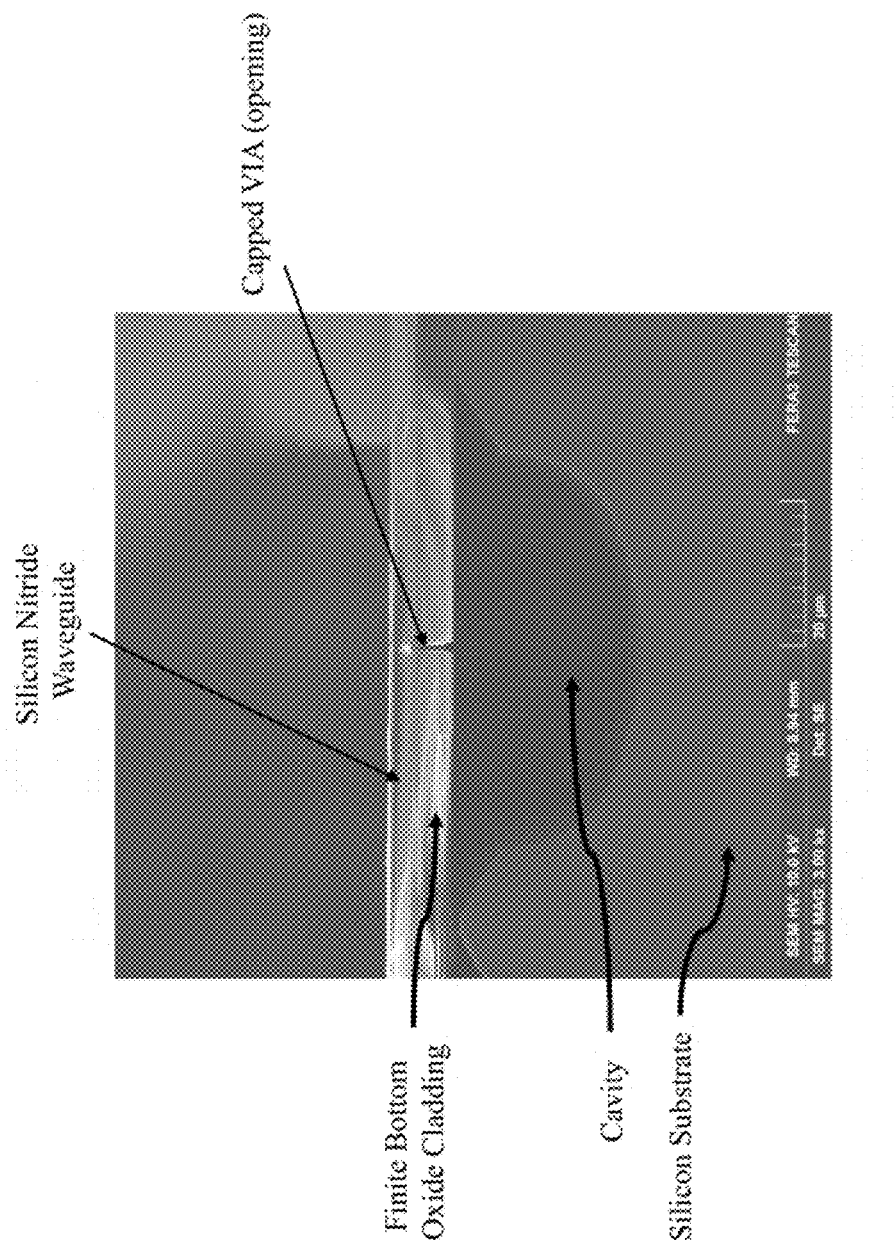
FIG. 14B is an enlarged view of a portion of FIG. 14A.

FIGS. 14A, 14B are SEM cross-sections of silicon nitride side coupled ring with top oxide cladding, finite bottom oxide cladding above air trench and silicon substrate. The silicon nitride waveguides with vertically and side coupled rings are fabricated via techniques such as low-pressure chemical vapor deposition (LPCVD) that is then patterned. The top cladding is silica deposited via plasma enhanced chemical vapor deposition (PECVD). The air cavities below the bottom silica oxide cladding are created via xenon difluoride (XeF2) gas etching in selective areas of silicon substrate through VIAs. After etching the cavity, these VIAs are filled by the addition of a final top cladding layer. FIG. 14A shows silicon nitride ring and bus waveguides with air trenches. FIG. 14B shows an enlarged view of FIG. 14A. It is illustrated in the images that all the openings (vias) were completely capped.

Figure 15:
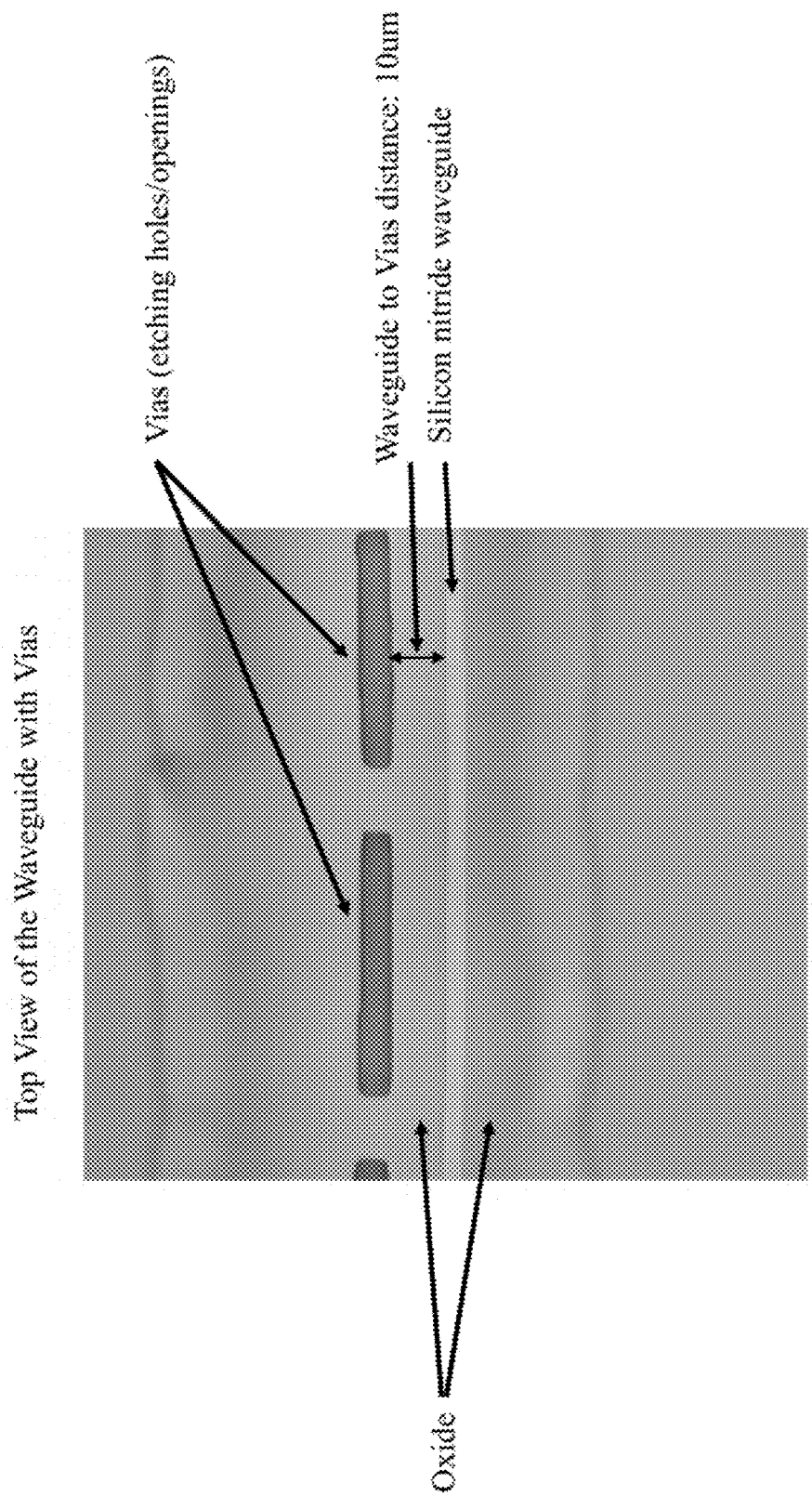
FIG. 15 is the top view of an example silicon nitride waveguide with vias.

FIG. 15 is a top view of the silicon nitride waveguide with vias (air cavities). The waveguide to via distance of 10 µm is good enough not to reach the modal field to the opening. The cavity etch using XeF2 is an isotropic etch which was timed to provide a minimum etch distance on the opposite side of the waveguide of at least 10 µm, to avoid the modal field from similarly reaching the remaining silicon. As shown, it is over etched. The vias have bridges to increase the strength of the unsupported oxide layers by connecting them at regular intervals. The bridges serve to minimize stress related changes in geometry and membrane breakage after trench (cavity) formation, that could impact in capping, CMP, dicing and handling steps.

The width of the vias is large enough to allow ready access of the XeF2 to the silicon surface as all etch chemistry of XeF2 in and reagent gases out must occur through these vias. The width is small enough to allow for complete closure after capping oxide deposition. The bridges are also deemed necessary as in the case of one continuous via around a circular waveguide, differential stress gradients may modify the vertical positioning of oxides on the inner and outer sides of the via, thus preventing the via to be closed by the capping oxide layer. To prevent contamination effects and the resulting losses, it was determined beneficial to connect in a ring, the inner and outer via oxide layers to ensure closure. The width of the bridge is kept small so that the isotropic XeF2 etch can still remove silicon in the bridged regions to a distance of at least 10 µm horizontally from the waveguide on both sides.

Figure 16:
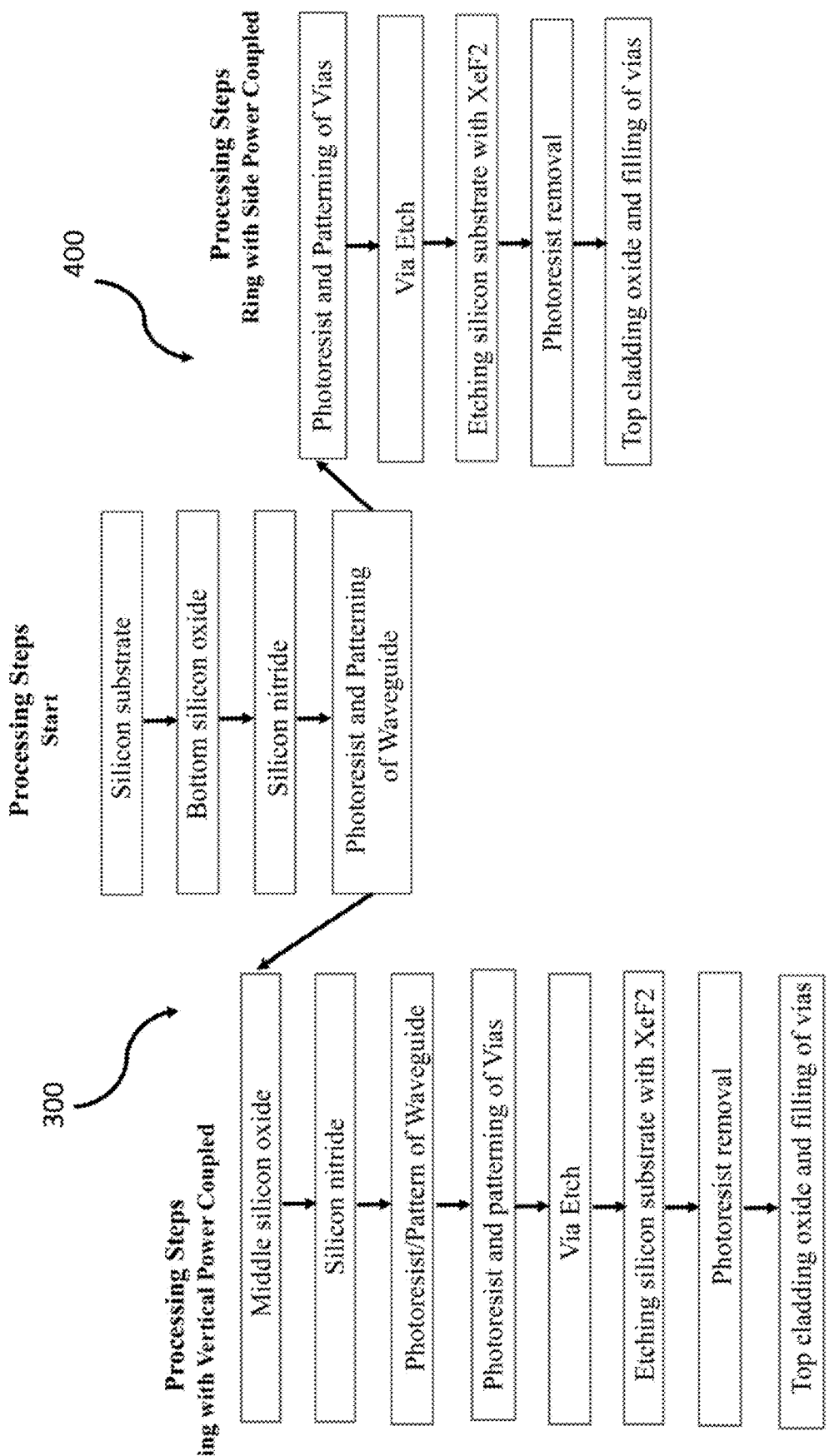
FIG. 16 is a flowchart illustrating a method application to the fabrication of the structures of FIGS. 1 to 7.

FIG. 16 illustrates a flowchart representing a method 300 for fabricating the vertical coupling structure 100 and a method 400 for fabricating the side coupling structure 200.

Modifications and improvements to the above-described embodiments of the present technology may become apparent to those skilled in the art. The foregoing description is intended to be exemplary rather than limiting.

The invention claimed is:

1. An optical waveguide structure for an optical chip system, the structure comprising:
   a substrate;
   at least one cladding layer deposited on the substrate;
   at least one waveguide structure connected to the at least one cladding layer, the at least one waveguide structure including at least one of:
   a resonator ring, and
   a waveguide; and
   at least one cladding overlayer deposited over the at least one of the resonator ring and the waveguide,
   a plurality of cavities being defined between the substrate and the at least one cladding layer, the plurality of cavities being formed by removal of material from the substrate,
   a plurality of openings being defined in the at least one cladding layer, each opening of the plurality of openings being fluidly connected at least one of the plurality of cavities,
   the plurality of cavities having been formed by etching of the substrate via the plurality of openings,
   the plurality of openings being sized and arranged to be closed by the at least one cladding overlayer, the at least one cladding overlayer covering the plurality of openings.

2. The structure of claim 1, wherein the plurality of cavities is positioned and arranged to merge and form a continuous cavity under select waveguides.

3. The structure of claim 1,
   wherein the at least one cladding overlayer is arranged to impede entry of contamination into the plurality of openings and the plurality of cavities.

4. The structure of claim 1, wherein:
   a thickness of the at least one cladding layer is at least 2 micrometers; and
   a thickness of the at least one cladding overlayer is at least 2 micrometers.

5. The structure of claim 4, wherein a distance between the waveguide and at least one of the plurality of openings is no less than 10 micrometers.

6. The structure of claim 1, wherein:
the plurality of openings is spaced and arranged to form a plurality of bridges in the at least one cladding layer; and
the plurality of bridges is configured to aid in maintaining structure of the at least one cladding layer in portions extending over the plurality of cavities in the substrate.

7. The structure of claim 1, wherein:
the at least one cladding layer includes:
   a first cladding layer deposited on the substrate,
   a second cladding layer deposited over the first cladding layer;
the at least one waveguide structure includes:
   the resonator ring formed on the first cladding layer, and
   the waveguide formed on the second cladding layer; and
the resonator ring and the waveguide are positioned and arranged for generally vertical coupling between them.

8. The structure of claim 7, wherein:
the resonator ring is formed from silicon nitride; and
the first cladding layer disposed on the substrate is formed from oxide cladding.

9. The structure of claim 1, wherein:
the at least one waveguide structure includes:
   the resonator ring formed on the at least one cladding layer, and
   the waveguide formed on the at least one cladding layer; and
the resonator ring and the waveguide are positioned in a same plane for side coupling arrangement, the plane being parallel to a surface of the substrate.

10. The structure of claim 9, wherein:
the ring resonator is formed from silicon nitride; and
the at least one cladding layer disposed on the substrate is formed from oxide cladding.

11. The structure of claim 1,
wherein:
   the at least one waveguide structure includes:
      the resonator ring, and
      the waveguide;
   the waveguide has:
      a width of about 2.8 micrometers, and
      a thickness of about 100 nanometers;
   the at least one cladding layer has a thickness of at least 2 micrometers; and
   the at least one cladding overlayer has a thickness of about 8 micrometers.

12. The structure of claim 1,
wherein:
   the at least one waveguide structure includes:
      the resonator ring, and
      the waveguide;
   the waveguide has:
      a width of about 2.8 micrometers, and
      a thickness of about 100 nanometers;
   the at least one cladding layer has a thickness of at least 2 micrometers, the at least one cladding layer being formed from oxide; and
   the at least one cladding overlayer has a thickness of about 2.5 micrometers, the at least one cladding overlayer being formed from silica.

13. The structure of claim 1,
wherein:
   the at least one waveguide structure includes:
      the resonator ring, and
      the waveguide;
   the waveguide has:
      a width of about 5.6 micrometers, and
      a thickness of about 40 nanometers;
   the at least one cladding layer has a thickness of at least 3 micrometers; and
   the at least one cladding overlayer has a thickness of about 15 micrometers, the at least one cladding overlayer being formed from silica.

14. The structure of claim 1, wherein the structure is adapted and configured for use in a chip-based inertial measurement system.

15. A method for fabricating an optical waveguide structure, the method comprising:
depositing at least one cladding layer on a substrate;
forming at least one waveguide structure on the at least one cladding layer, the at least one waveguide structure including at least one of:
   a resonator ring, and
   a waveguide;
depositing and patterning a layer of photoresist over at least the at least one cladding layer and the at least one waveguide structure;
etching, via the photoresist, a plurality of openings through at least the at least one cladding layer;
etching, via the plurality of openings, portions of the substrate to form a plurality of cavities between the substrate and the at least one cladding layer; and
depositing a cladding overlayer over the resonator ring and the at least one cladding layer the cladding overlayer covering the plurality of openings.

16. The method of claim 15, wherein etching the plurality of cavities in the substrate includes etching a silicon substrate using XeF2.

17. The method of claim 15, wherein depositing the at least one cladding layer and forming the at least one waveguide structure comprises:
depositing a first oxide cladding layer on the substrate;
forming a resonator ring on the first oxide cladding layer;
depositing a second oxide cladding layer over the resonator ring and the first oxide cladding layer; and
forming a waveguide on the second oxide cladding layer.

18. The method of claim 17, wherein:
etching the plurality of openings includes etching through the second oxide cladding layer and the first oxide cladding layer; and
depositing the cladding overlayer includes depositing the cladding overlayer over the waveguide and the second oxide cladding layer.

* * * * *